Figure 1:
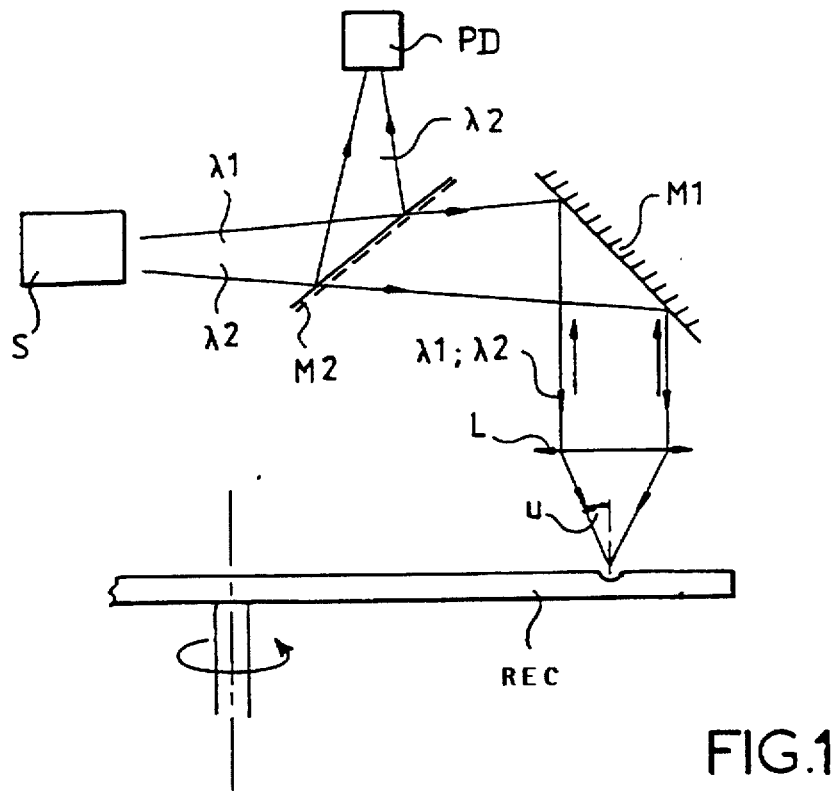

United States Patent [19]

Le Carvennec et al.

[11] Patent Number: 5,680,386
[45] Date of Patent: Oct. 21, 1997

[54] OPTICAL METHOD AND SYSTEM FOR WRITING/READING INFORMATION ON A RECORDING MEDIUM

[75] Inventors: François Le Carvennec, Cernay; Jean-Pierre Huignard, Paris; Claude Puech, Ballainvilliers; Brigitte Loiseaux, Villebon S/Yvette, all of France

[73] Assignee: Thomson-CSF, Paris, France

[21] Appl. No.: 507,232
[22] PCT Filed: Dec. 22, 1994
[86] PCT No.: PCT/FR94/01517
 § 371 Date: Aug. 23, 1995
 § 102(e) Date: Aug. 23, 1995
[87] PCT Pub. No.: WO95/17747
 PCT Pub. Date: Jun. 29, 1995

[30] Foreign Application Priority Data

Dec. 23, 1993 [FR] France ................. 93 15550
Jul. 13, 1994 [FR] France ................. 94 08736

[51] Int. Cl.⁶ ............................................ G11B 7/00
[52] U.S. Cl. ............... 369/116; 369/100; 369/275.2; 369/44.37
[58] Field of Search ........................ 369/125, 116, 369/100, 112, 120, 275.2, 275.4, 44.37, 44.38, 44.34; 359/322, 256, 254, 296, 247, 249; 385/5

[56] References Cited

U.S. PATENT DOCUMENTS

| | | |
|---|---|---|
| 3,909,608 | 9/1975 | Le Merer et al. . |
| 3,912,922 | 10/1975 | Lacotte et al. ................. 250/204 |
| 3,945,790 | 3/1976 | Puech . |
| 4,020,278 | 4/1977 | Carre et al. ................. 369/275.5 |
| 4,024,513 | 5/1977 | Huignard et al. . |
| 4,037,251 | 7/1977 | Bricot et al. . |
| 4,038,524 | 7/1977 | Puech et al. . |
| 4,039,764 | 8/1977 | Bricot et al. . |
| 4,052,706 | 10/1977 | Spitz et al. ................. 365/235 |
| 4,068,258 | 1/1978 | Bied-Charreton et al. . |
| 4,142,208 | 2/1979 | Oprandi et al. ................. 369/120 |
| 4,157,931 | 6/1979 | Bricot et al. . |
| 4,176,277 | 11/1979 | Bricot . |
| 4,199,783 | 4/1980 | Huignard et al. ................. 369/125 |
| 4,387,452 | 6/1983 | Bricot et al. . |
| 4,405,862 | 9/1983 | Bricot et al. . |
| 4,449,785 | 5/1984 | Huignard et al. . |
| 4,551,733 | 11/1985 | Cornet . |
| 4,868,804 | 9/1989 | Carvenec et al. ................. 369/44.34 |
| 4,888,266 | 12/1989 | Lacotte et al. . |
| 5,258,969 | 11/1993 | Refregier et al. . |
| 5,319,481 | 6/1994 | Fergason ................. 369/100 |
| 5,323,372 | 6/1994 | Puech et al. ................. 369/100 |

FOREIGN PATENT DOCUMENTS

| | | |
|---|---|---|
| 0 159 785 | 10/1985 | European Pat. Off. . |
| 54-000834 | 6/1979 | Japan . |
| 62-162252 | 12/1985 | Japan . |
| 3-273545 | 12/1991 | Japan . |
| 6-068474 | 3/1994 | Japan . |

*Primary Examiner*—Loha Ben
*Attorney, Agent, or Firm*—Oblon, Spivak, McClelland, Maier & Neustadt, P.C.

[57] ABSTRACT

Method, system and recording medium in which the writing of information is achieved by the use of a write beam including the superposition of a first optical beam at a first wavelength and of a second beam at a second wavelength less than the first wavelength. Reading is done by the use of a second optical beam at the second wavelength. The material of the recording medium is a non-linear material exhibiting a recording threshold situated between the maximum of the sum of the energies of the two beams and an energy level situated in the vicinity of the maximum energy of the first beam.

40 Claims, 8 Drawing Sheets

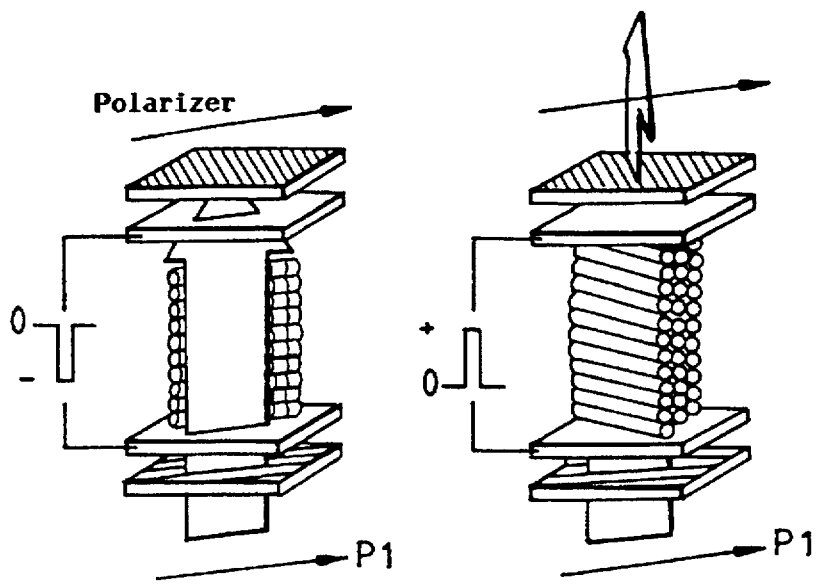
FIG.6a                                                      FIG.6b
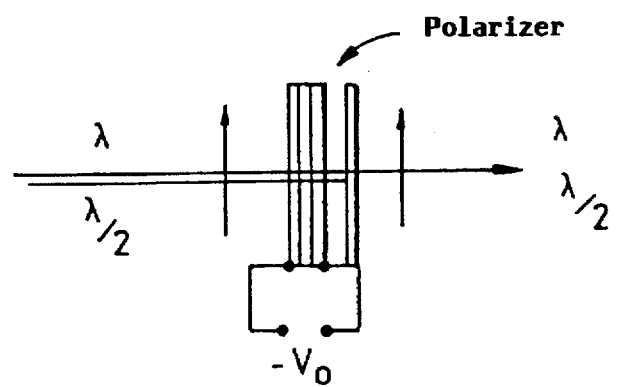
FIG.7a
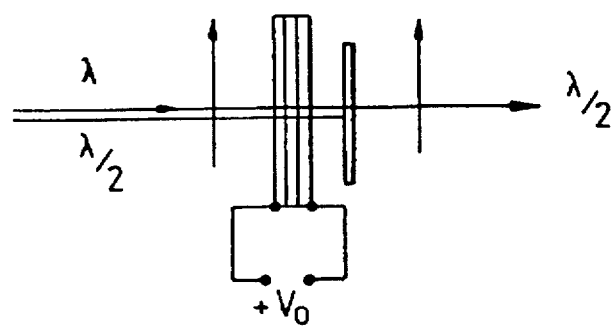
FIG.7b

OPTICAL METHOD AND SYSTEM FOR WRITING/READING INFORMATION ON A RECORDING MEDIUM

The invention relates to an optical system and method for writing/reading information on a recording medium. It also relates to a recording medium.

The principles of optical storage which are being developed at the present time employ semiconductor lasers operating in the near IR ($\lambda \approx 0.8$ µm), in order typically to obtain storage densities of the order of $10^8$ bits $cm^{-2}$. These orders of magnitude correspond to the writing of elementary bits of the order of 0.8 µm in diameter on a read-only disc, or a magneto-optical writable and erasable medium. The object of the invention is to obtain a significant improvement in the storage capacity. It is possible to increase the storage capacity by increasing the information density per unit of surface area of the recording medium. It is also possible to increase this capacity by recording into the thickness of the recording medium.

The embodiment principles and means forming the subject of the invention are fully compatible with the optical structure of read heads for optical discs and digital optical memories.

The invention thus relates to an optical method of writing/reading information on a recording medium, characterized in that the writing of information is achieved by use of a write beam including the superposition of at least a first optical beam at a first wavelength ($\lambda$) and at least a second optical beam at a second wavelength ($\lambda/2$) which is less than the first wavelength.

The invention also relates to an optical system for writing/reading information for a recording medium, characterized in that it includes an optical source emitting a beam at a first wavelength, and a frequency changer receiving this beam and transmitting, to the recording medium, a write beam comprising a first beam at a first wavelength and a second beam at a second wavelength less than the first wavelength.

Finally, the invention relates to an optical recording medium, characterized in that it includes a non-linear material exhibiting a recording threshold such that it records an information item by the use of a first beam of a first wavelength in a part only of the illuminated area, the information being recorded in such a way that it can be read only by a second beam of a second wavelength less than the first wavelength.

The method of the invention allows recording/reading on a preformatted medium on which the preformatting information has a resolution corresponding to a read beam at the first wavelength.

It thus includes the following steps:
  reading of the preformatting information by use of the two superposed beams at a low power level (of the order of a few mW, or less than one mW);
  switching of the two superposed beams to a high power level above the low-power level;
  writing of data information onto the information medium by modulation of the two beams at high-power level, or of one of the two beams;
  blocking of the first beam and transmission of the second beam alone for reading the data information.

The invention also relates to a method characterized in that the blocking of the first beam is done in a blocking time which can be greater than 10 ms.

Figure 2A:
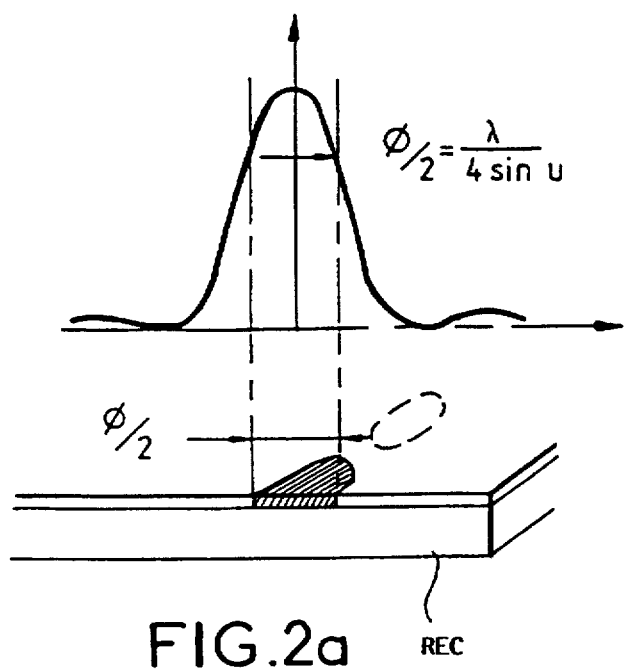
Figure 2B:
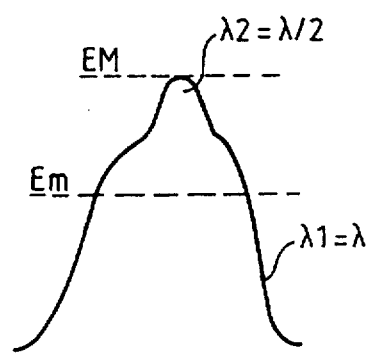
Figure 3:
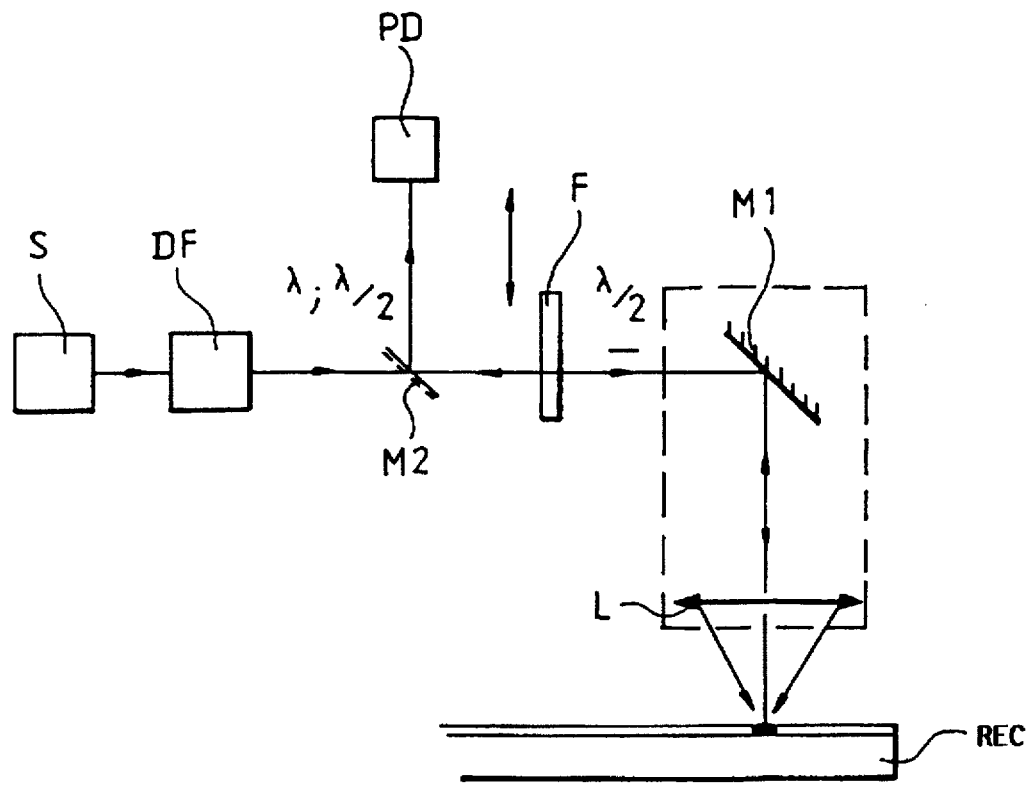
Figure 4:
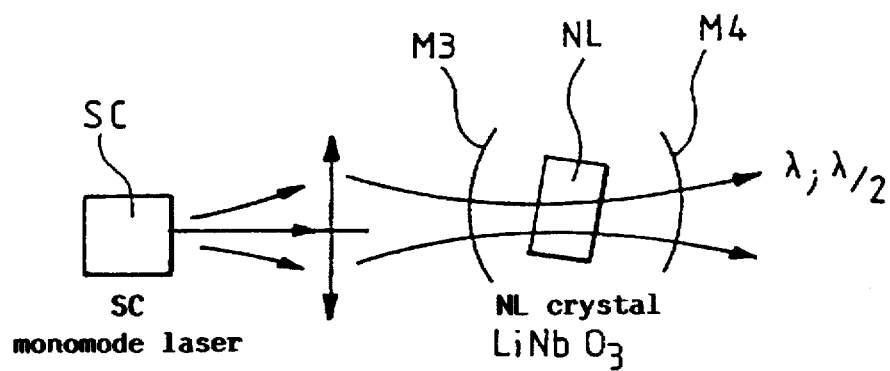
Figure 5A:
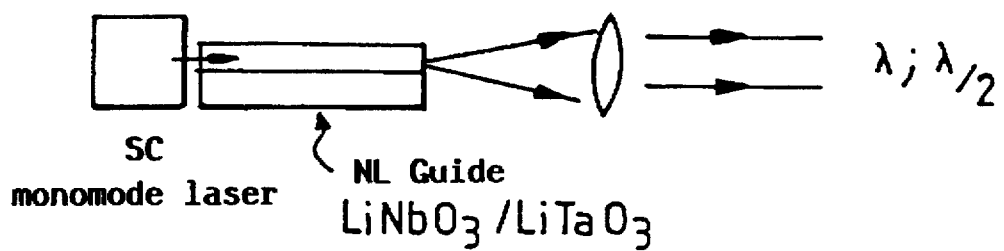
Figure 5B:
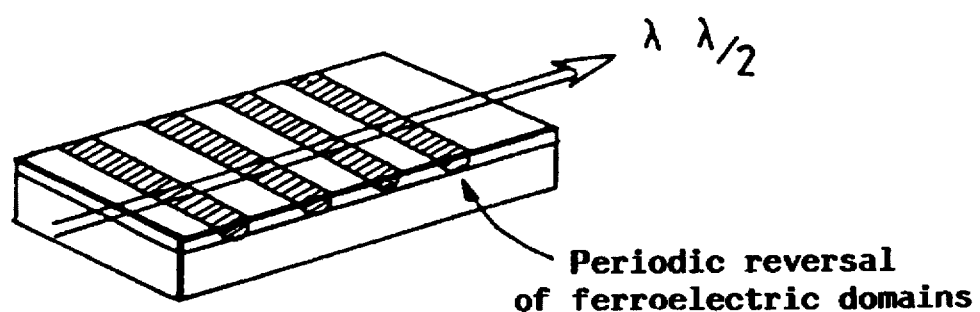
Figure 8:
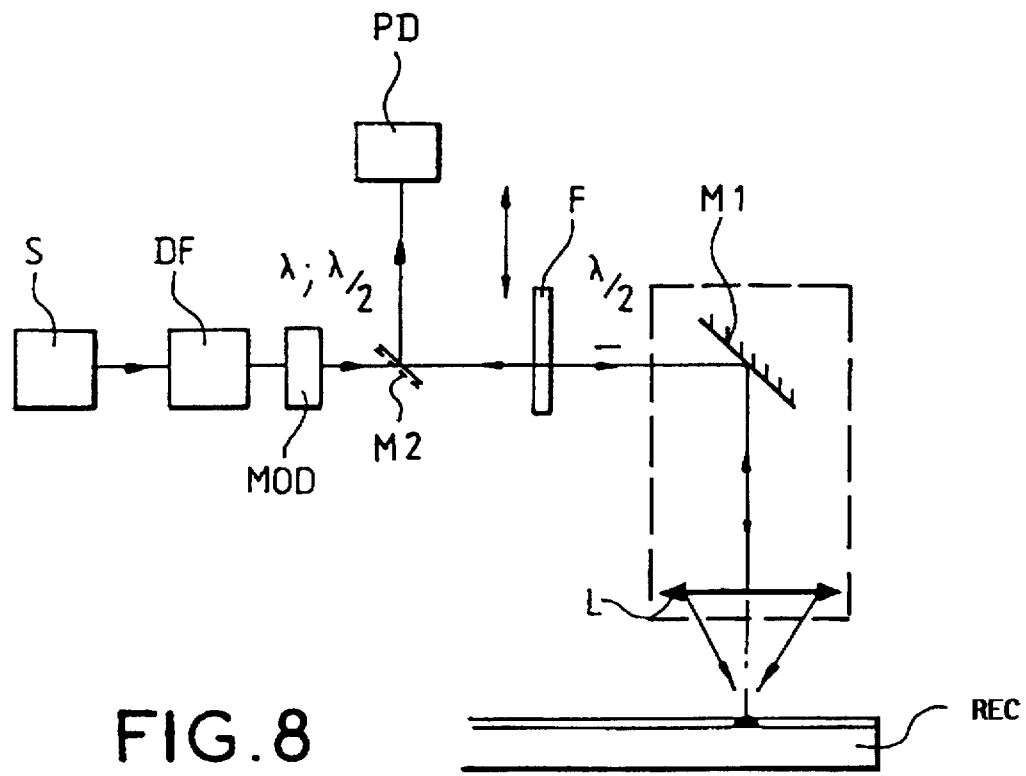
Figure 9:
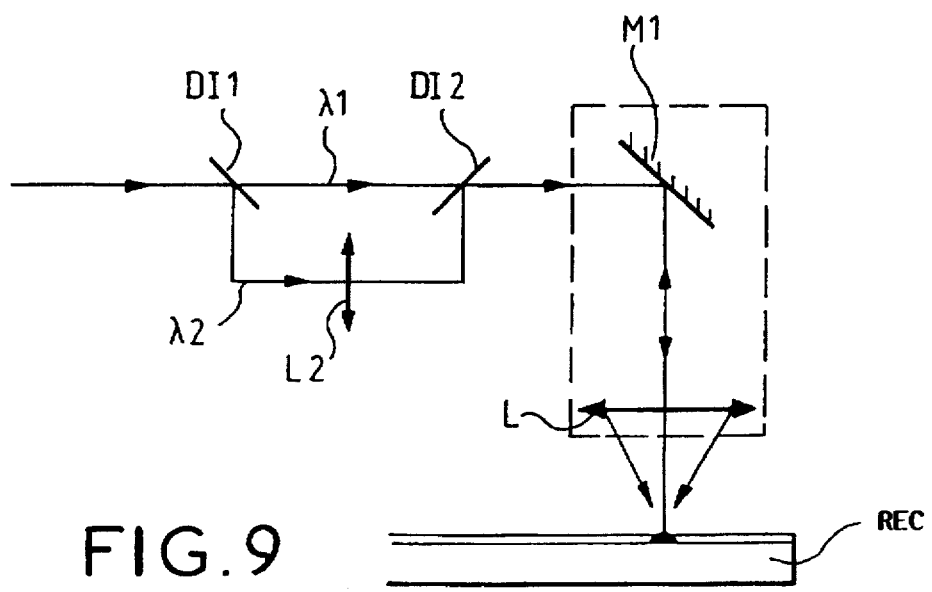
Figure 10:
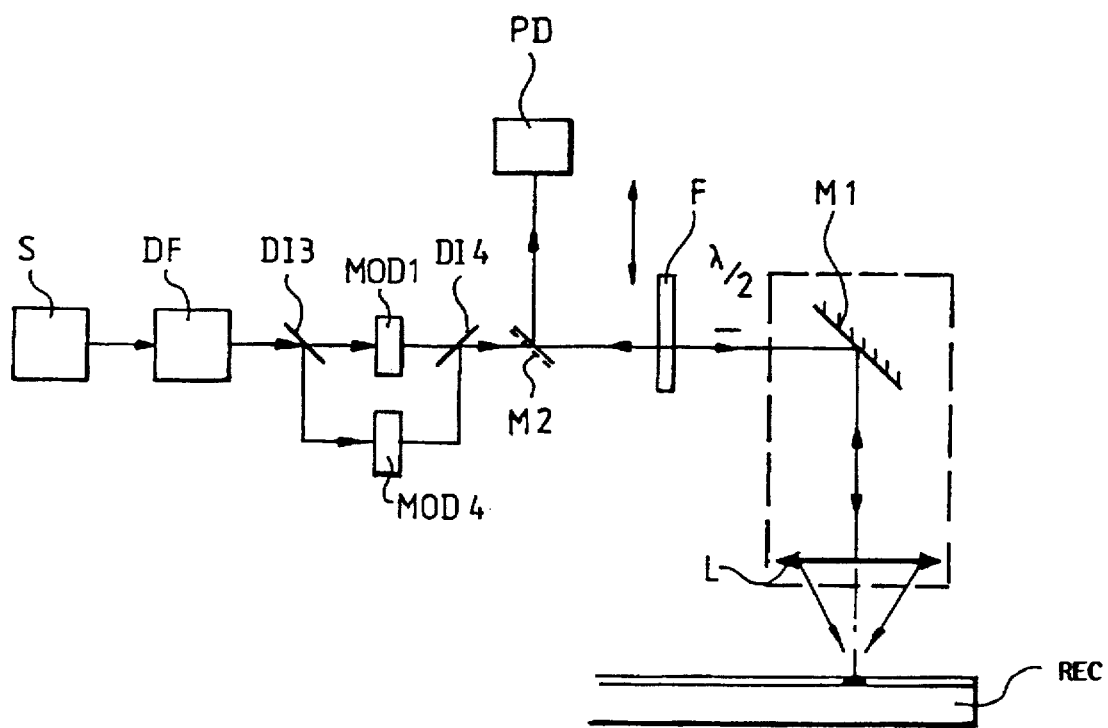
Figure 11:
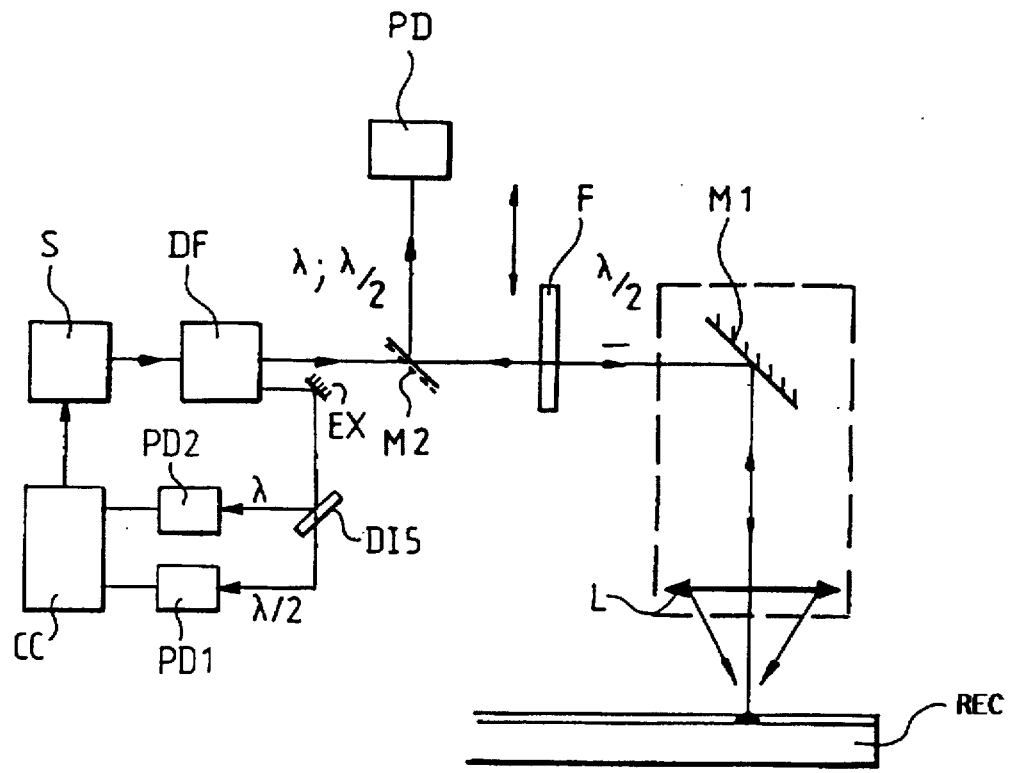
Figure 12:
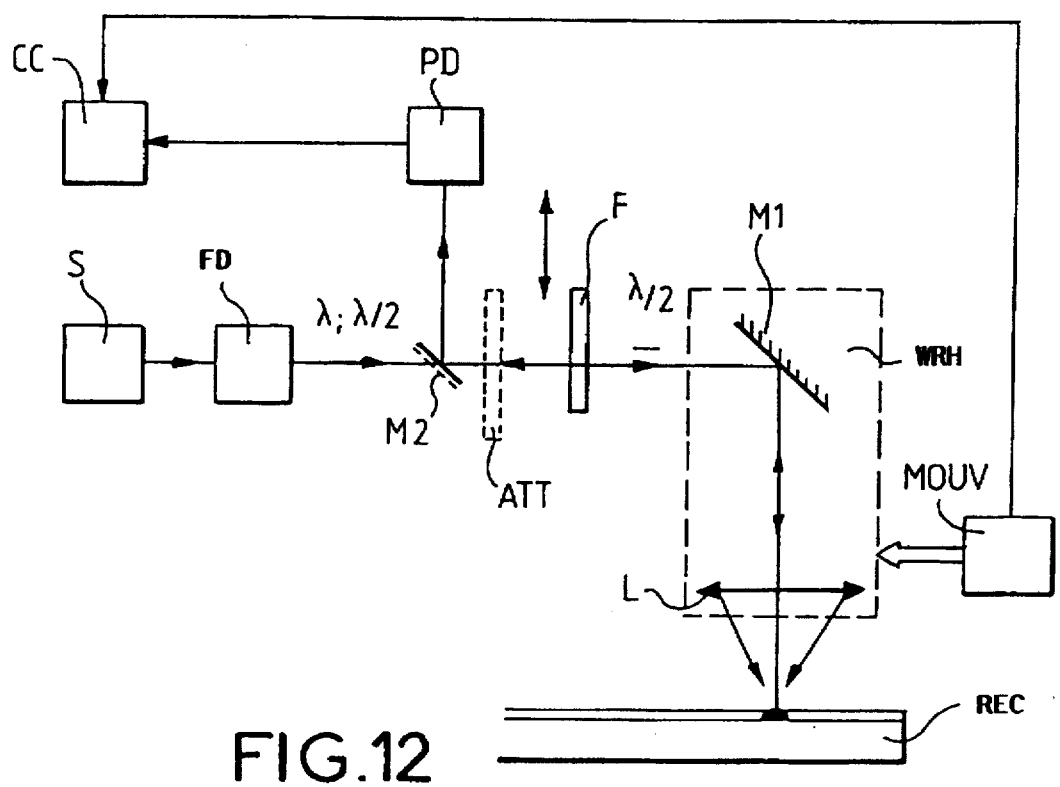
Figure 13A:
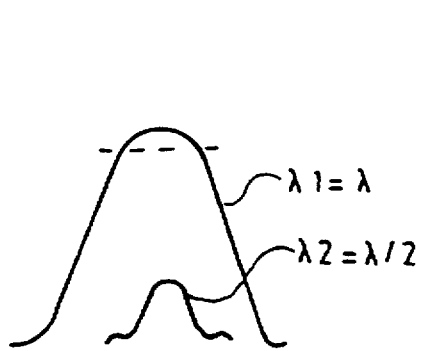
Figure 13B:
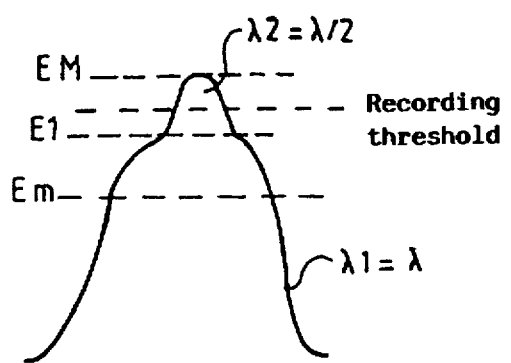
Figure 14:
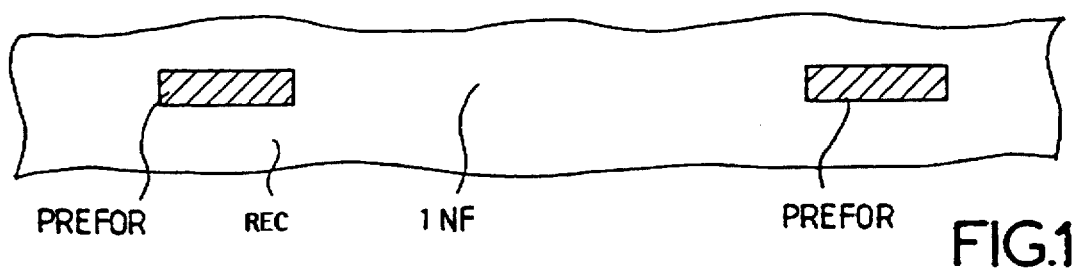
Figure 15A:
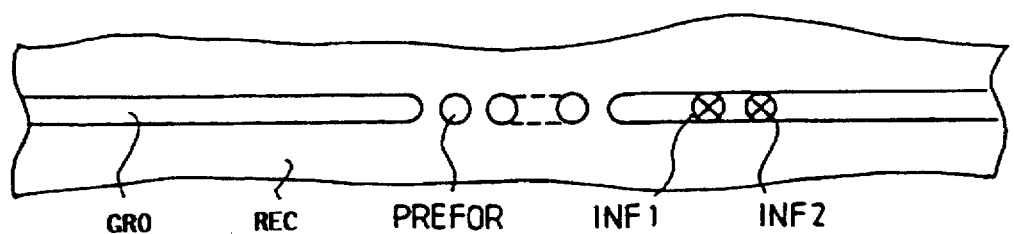
Figure 15B:
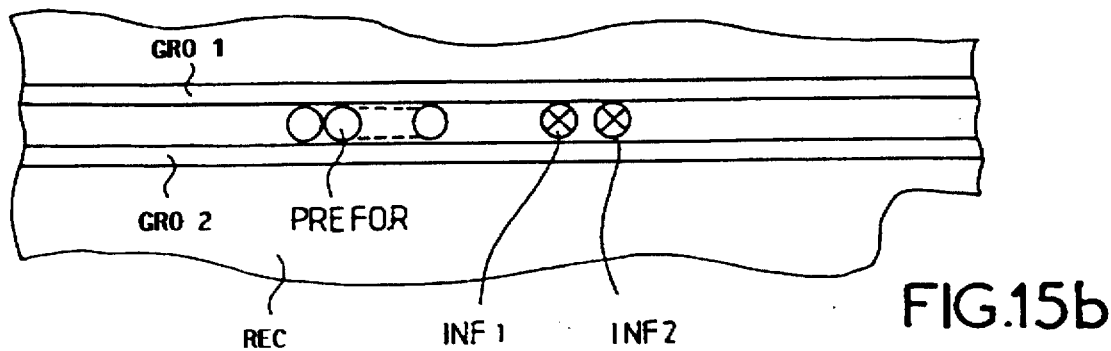

The various subjects and characteristics of the invention will emerge more clearly in the description which will follow, and in the attached figures which represent:

FIG. 1, a general example of embodiment of the method and of the system according to the invention;
  FIGS. 2a and 2b, a diagram explaining the recording according to the invention;
  FIG. 3, a more detailed example of the system according to the invention;
  FIGS. 4, 5a and 5b, examples of frequency doublers according to the invention;
  FIGS. 6a, 6b, 7a and 7b, an example embodiment of a filtering device usable in the system of FIG. 3;
  FIG. 8, a variant embodiment of the system of FIG. 3;
  FIG. 9, a system making it possible to focus the two wavelengths contained in the recording beam at the same point;
  FIG. 10, a system making it possible to record into the thickness of the recording medium;
  FIGS. 11 and 12, systems making it possible to set +e.cir è+ee the power of the source;
  FIGS. 13a, 13b, energy diagrams explaining the method and the system according to the invention;
  FIGS. 14, 15a, 15b, examples of preformatted recording media usable in the context of the invention.

According to a general method of recording/reading, a recording medium is available made of a non-linear material which can be recorded by the use of an optical beam in such a way that only the area which is taken beyond an energy threshold undergoes an optically readable alteration (optical mark). In what follows, the sensitive layer in which the information is recorded is designated by recording medium.

In the context of the explanation which follows, it is assumed that the medium is immobile for the duration of the irradiation, but these explanations would be equally valid in the case in which it is moving.

A light beam of wavelength $\lambda 1=\lambda$ incident on an area of the recording medium exhibits energy levels in this area exhibiting a distribution, for example, according to a Gauss curve, the energy maximum lying at the centre of the illuminated area. In FIG. 1, the recording medium REC being made of non-linear material, only the part of the illuminated area the received energy of which exceeds the recording energy threshold is therefore recorded. In the rest of the description, the part of this illuminated area which thus changes physical state will be designated by "mark".

Under these conditions the diameter $\phi re$ of the recorded mark is smaller than the diameter of the illuminated area.

For reading, a light beam is used, the wavelength $\lambda 2$ of which corresponds to the resolution of the mark to be read. $\lambda 2$ is therefore less than the recording wavelength.

A general method of recording/reading according to the invention consists in having available a recording medium made of non-linear material which can be recorded by the use of an optical beam in such a way that only the area which is taken beyond an energy threshold changes physical state, that is to say is recorded. A light beam of wavelength $\lambda 1=\lambda$ on an area of the recording medium exhibits energy levels in this area exhibiting, for example, a distribution according to a Gauss curve, the energy maximum lying at the centre of the illuminated area. With the recording medium being made of non-linear material, only the part of the illuminated area the energy of which exceeds the recording energy threshold is therefore recorded.

Under these conditions the diameter of the recorded mark is smaller than the diameter of the illuminated area.

According to a method of the invention, provision is made to write information by the use of a write beam which is the superposition of two optical beams at two different wavelengths $\lambda 1$ and $\lambda 2$. For example, one of the beams is at $\lambda$ and the other is at $\lambda/2$.

By using the sum of the energies at λ1 and λ2, it is arranged that the material of the recording medium exhibits a thermal non-linearity threshold (see FIG. 2b) which lies between the maximum of the energies EM of the two beams at λ1 and at λ2, and an energy level Em lying between the 3 dB level of the energy curve of the beam at λ1 and the maximum of the curve at λ1.

For preference, the level Em lies slightly below the energy maximum at λ1. According to this choice, the diameter of the mark written on the recording medium corresponds substantially to the illumination diameter on the medium by the beam at λ2.

According to the invention, for reading, a light beam is used the wavelength λ2 of which corresponds to the resolution of the mark to be read, and is therefore less than the preceding wavelength λ2.

In the description which follows, a beam of wavelength λ1=λ is used, which makes it possible to record a mark the diameter Φ/2 of which is half of the diameter Φ of the illuminated area.

The diameter Φ of the diffraction spot projected onto the medium is equal to $$\Phi = \frac{\lambda}{2 \sin u},$$

sin u being the numerical aperture of the focusing objective (FIG. 1). By way of example, FIG. 2 shows a mark of diameter Φ/2 obtained after focusing of a spot of diameter Φ onto a "sensitive" medium with the energy contained in a cylinder the diameter of which is equal to of the order of Φ/2. These mechanisms are commonly encountered with media which exhibit a pronounced threshold on recording: magnetooptical layers, phase change, ablation, etc. In order to make the invention better understood, by way of example, in the case of writing of information in the form of separate marks, the illuminated areas with diameter Φ corresponding to the writing of two successive information items overlap. The marks written with diameter Φ/2 are then very close to one another. The object of the invention is therefore, in this case, to read the elementary information, with a size reduced by a factor of 2 on writing with a radiation of wavelength λ2=λ/2. Such a beam passing into the focusing objective L generates, on the disc, a read spot the diameter of which is equal to $$\frac{\lambda}{4 \sin u}.$$

This diameter is thus perfectly matched to reading information bits written at the wavelength λ by invoking the mechanisms described above.

By way of example, the writs beam has the wavelength substantially of λ1=0.8 μm and the read beam has the wavelength of λ2=0.4 μm.

According to the method of the invention, the read beam at the wavelength λ2 is aimed at the recording medium along a direction which is collinear with that of the recording beam at the wavelength λ1.

The read beam is retransmitted (reflected for example) to an optical detection device which detects the intensity of the retransmitted beam.

In the case of a recording having affected the physical nature of the recording medium, it is actually a question of detecting a variation in the intensity of the retransmitted beam. In the case of a thermomagnetic recording, the magneto-optic reading is done by the use of detection systems which exploit the rotation of the polarization of the light, and it is also a question of detecting light intensity.

According to the method of the invention, it is also arranged, during writing, to transmit a write beam which contains a wavelength at λ1 and a wavelength at λ2 (with λ2<λ1). This beam may be the superposition of a beam at the wavelength λ1 and of a beam at the wavelength λ2. For example, λ2 is the length of the read beam, and the read beam at λ2 can be transmitted on writing at the same time as the beam at λ1. This possibly allows simultaneously reading the writing and thus checking it.

FIG. 1 represents a general example of a system for writing/reading according to the invention.

A source S emits a write beam at the wavelength λ1. This beam allows writing on a medium REC, as is represented in FIG. 2, and as has already been described, on a part of the illuminated area. The beam is focused onto the recording medium REC by a lens L.

The source S (or another source) is also capable of illuminating the recording medium with a read beam at the wavelength λ2. The read beam is transmitted by the recording medium REC to a photodetector PD which thus makes is possible to read the information on the medium REC. For example, in the case of a medium operating in reflection, the read beam is reflected as is the case in FIG. 1.

FIG. 3 represents a more detailed embodiment of the system of the invention.

The source S emits a light beam at the wavelength λ1. A frequency changer, a frequency doubler FD for example, receives this beam and transmits two superposed beams one of which is at the wavelength λ1=λ and the other at the half wavelength λ2=λ/2 resulting from the frequency doubling. A mirror M1 directs these two beams onto the recording medium REC where they are focused by a lens L. An information mark can thus be recorded. Modulation of the recording beam can be obtained, for example, by modulation of the source S.

The light of these beams is reflected by the recording medium. A dichroic mirror M2 reflects the light of the read beam at the wavelength λ2 towards the photodetector PD.

Moreover, in the read mode of the system according to the invention, the frequency doubler FD transmits the two wavelengths λ1 and λ2. However, a removable or controllable filter F can block the transmission of the beam at the wavelength λ1=λ.

By way of example, the system of FIG. 3 includes:

a modulated monomode laser operating at the wavelength λ—for example λ=840 nm a frequency doubler device generating, with an efficiency η, the "blue" wavelength λ/2≈420 nm a conventional optical system providing focusing and servocontrol of the spots on the disc. The paths of the beams at λ and λ/2 are perfectly collinear.

In the present system, advantage is taken of the limited conversion efficiency of the doubler (η≈a few % typically) to generate two beams λ and λ/2 with respective intensities (1−η) $I_o$ and η $I_o$ ($I_o$ intensity incident on the doubler).

In fact the reading, which is not destructive of the information recorded on the disc, leads to a read power being used which is markedly weaker than that necessary for writing. Typically, the following power levels are employed:
Writing≈20–40 mW
Reading≈2–5 mW The frequency doubler FD can be designed according to two different technologies which are suitable for generating beams at the wavelengths λ and λ/2.

According to a first technology, a laser doubled in frequency by focusing of a monomode semiconductor laser in a non-linear crystal is used. A diagram of a semiconductor laser doubled in external configuration is given in FIG. 4. It includes:

a monomode GaAs/GaAlAs semiconductor laser SC delivering 100 mW at $\lambda$=840 nm a NL crystal, for example KNbO$_3$, placed within a resonator M3, M4, matched to the wavelengths $\lambda$ and $\lambda/2$.

Continuously emitted powers of the order of 10 mW at $\lambda/2$=420 nm have been obtained from laser structures of this type (see for example the document "432 nm source based on efficient second harmonic generation of GaAlAs diode laser radiation of self-locking external resonant cavity", G. L. Dixon et al. Optic. letters. 14–731 1989).

According to a second technology, the guided propagation of a laser beam in a non-linear crystal is used. The principle of this frequency doubling by propagation in a LiNbO$_3$ or LiTaO$_3$ guide is presented in FIGS. 5a and 5b. In order to maintain phase matching over an interaction length of the order of 5 to 10 mm, the guide consists of regions having a periodic reversal of the domains (spatial period $\Lambda \approx 3.6$ µm in LiTaO$_3$).

The orders of magnitude of the optical powers available in the beam at $\lambda 1$ (for example in the red) and in the beam at $\lambda 2$ (for example in the blue) are therefore very widely compatible with the methods for recording and reading information at high density according to the invention.

As for the filter F, in the mode of operation of the record/read system, it is important to be able to reread the information at the $\lambda 2$ wavelength alone. Under these conditions, the optical power available at the wavelength $\lambda 1$ has to be shut off rapidly, for example by means of an electrooptical modulator. The filter F therefore has to carry out the following two functions:

rapid shutting off of the beam at the $\lambda 1$ wavelength with a response time typically less than 100 µs;

continuous transmission of the beam at the low-power $\lambda 2$ wavelength.

This function, which is unconventional for a modulator, can be carried out by an electrooptical crystal (LiNbO$_3$, LiTaO$_3$ for example) or by a ferroelectronic liquid crystal cell, the operating mode of which is as follows: the application of a control voltage$\pm V_o$ causes the molecules to turn by an angle $2\Theta$ in a plane parallel to the entry face of the cell. An incident beam polarized along the direction P1, as indicated in FIG. 6a (voltage $-V_o$), remains polarized in this same direction after passing through the cell. After rotation of the molecules ($2\Theta$) under the action of a reverse voltage, the initial polarization is affected by the birefringence effect $\Delta n$ of the molecule. After passing through the polarizer, the transmitted intensity is given by:

$$\frac{\pi d \Delta n}{\lambda}$$

$$I_p = I_o \sin^2 4\Theta \times \cos^2$$

for $\Delta n = 0$ ($V = -V_o$ in FIGS. 6a and 7a, the wavelengths $\lambda$ and $\lambda/2$ are transmitted (recording mode)

for $\Delta n \neq 0$ ($V = +V_o$ in FIGS. 6b and 7b) and $d = \lambda/2 \Delta n$, the $\lambda$ wavelength is not transmitted, on the other hand the $\lambda/2$ wavelength is transmitted intact.

The ferroelectric liquid crystal modulator can be produced as follows:

ferroelectric cell $V = \pm 8$ volts thickness $d \approx 10$ µm optical transmission >80% at $\lambda$ and $\lambda/2$.

The filter F can also be produced in the form of a dichroic filter which is introduced mechanically into the path of the beam. In the absence of a filter, the two wavelengths $\lambda$ and $\lambda/2$ are transmitted. In the presence of the filter, only the $\lambda/2$ wavelength is transmitted.

FIG. 8 represents a variant embodiment of the system of FIG. 3. In effect, in the system of FIG. 3, the write and read beams are modulated by modulation of the operation of the source S. In the system of FIG. 8, an optical modulator MOD has been provided, such as an electrooptical or acoustooptical modulator (made of LiNbO$_3$ for example), situated between the source S and the recording medium REC. According to the embodiment of FIG. 8, this modulator is situated between the frequency doubler FD and the recording medium, and more precisely between the frequency doubler and the dichroic device M2. It could equally have been placed between the source S and the doubler.

The filter F has been kept in FIG. 8. However, according to another embodiment variant, not represented, it can be envisaged that the filter F is not provided. In this case, the same modulator (MOD) makes it possible, during reading, to block the transmission of the light at the $\lambda 1$ recording wavelength, and to let through only the light at the $\lambda 2$ read wavelength. The modulator thus also fulfils the role of the filter F.

Thus it is seen that, for writing, two wavelengths $\lambda 1$ and $\lambda 2$ are transmitted. The focusing optics L should for preference therefore be achromatic so that the two wavelengths $\lambda 1$ and $\lambda 2$ are focused in the same plane as the recording medium. If this is not the case, it is possible, as represented in FIG. 9, to provide a circuit which separates the two wavelengths along two paths, and in which one of the paths modifies the convergence of one of the beams so that the two wavelengths converge in the same plane. For example, after the filter F, a dichroic plate DI1 is provided, which transmits the $\lambda 1$ wavelength and which reflects the $\lambda 2$ wavelength. In the path of the $\lambda 2$ wave, a focusing correction lens L2 is provided. Next the two wavelengths are recombined by another plate DI2. The focusing lens L then focuses the two wavelengths $\lambda 1$ and $\lambda 2$ in the same plane.

As the system of the invention has provision for transmitting two wavelengths $\lambda 1$ and $\lambda 2$ to the recording medium on writing, if the focusing objective is not achromatic, the two wavelengths $\lambda 1$ and $\lambda 2$ focus in different planes and the invention then makes it possible to record into the thickness of the recording medium. FIG. 10 thus makes provision for separating the two wavelengths by the use of a dichroic plate DI3, and separately to modulate the two wavelengths by the use of modulators MOD1 and MOD2. Next, the two waves are recombined (DI4) and transmitted to the information medium which records different information in two different planes of the medium.

In application of the foregoing, the invention also relates to a recording medium made of a thermally non-linear material, such that it records the information by the use of a beam with a first wavelength $\lambda 1$. The information recording density is such that it is difficult or nearly impossible to reread the information with a beam of the same wavelength $\lambda 1$. It is therefore necessary to have recourse to a beam of shorter wavelength $\lambda 2$ thus allowing greater resolution. According to a preferred embodiment of the invention, the wavelength $\lambda 2$ is half of the wavelength $\lambda 1$.

For correct operation it is necessary, at the recording wavelength $\lambda 1$, for the recording medium to absorb sufficient energy for the beam to make a mark. It is also necessary, in the case of reading by reflection, that at the read wavelength $\lambda 2$, the medium reflects the read beam sufficiently.

A practical embodiment of the invention makes provision for recording the medium with a wavelength situated in the infrared and for reading it with a wavelength situated in the blue.

The recording medium may be made of a material with non-erasable recording, and may be recorded by one of the following effects:
   thermal ablation of the recording material (the material is based, for example, on tellurium);
   physical transformation of the material, the recording material being constituted, for example, of several layers of different materials which, under heating, interact to constitute an alloy in the recording area;
   creation of a bubble in the area of heating, the material including an inner layer made of material such that under heating this material decomposes and gives rise to a bubble within the recording medium;
   change of phase of the recording material, the latter passing, under heating, from a crystalline state, to an amorphous state, for example.

The recording medium may also be a rewritable material. The material is then, for example, a magnetooptical (or thermomagnetic) material, or a phase-changing material which, under heating and application of a magnetic field, may undergo alterations to the orientations of the magnetic domains. Reading is then done by Kerr effect or by Faraday effect. According to these effects, a polarized optical beam has its polarization rotated under the effect of a magnetic field.

The recording medium may be formatted, that is to say be prepared so that the recording is done on the medium according to a defined format and defined rules.

The recording medium may be a disc, for example. The formatting then consists in preparing the medium so that the information is recorded along concentric tracks or a spiral track. The medium includes means which "predraw" these tracks. These means can be guide tracks (format of the Continuous Composite type) or markers or "flags" arranged regularly on the disc along the track to be recorded (Sampled format).

In standby position of the system, in the case of the use of a medium formatted according to the "Continuous Composite" type, the laser source operates and a beam is continuously illuminated all along the track. In the case of the use of a medium formatted according to the "Sampled" type, the laser source operates only at the moment of the reading of the flags (and/or address information). The Sampled format makes it possible thus to spare the source.

Moreover, the writing of information requires setting the light source to an energy level which is sufficient for a spot the diameter of which is well controlled. Setting-up regions, reserved for this setting-up, are therefore provided on the recording medium. Before recording, test marks are recorded which it is wished to reread by the use of a read beam so as to be satisfied that the recording of these marks is correct. The procedure for recording these spots is therefore such that provision is made for a first pass for the recording and a second pass for the check reading.

According to the invention, the combination of the write beam at two wavelengths with a recording medium exhibiting a thermal non-linearity threshold implies relative stability of the power from the source. In fact, with the non-linearity threshold being fixed, it is appropriate to fix the emission power of the source in such a way that the write threshold is situated on the energy distribution curve of the wave at $\lambda 1$ at a level allowing writing of a mark the diameter of which corresponds to the illumination diameter with the wave at $\lambda 2$. The invention thus also makes provision to set the power from the source S.

To do that, according to the system of FIG. 11, a part of the light beam is picked up (device EX), and this picked-up part is sent to a photodetector which delivers an electrical signal proportional to the power of the light beam, and which acts in feedback mode on the setting of the power from the source S.

In FIG. 11, two photodetectors PD1 and PD2 have been provided, which, via a dichroic separator DIS, receive respectively the light of wavelength $\lambda/2$ and the light of wavelength $\lambda$. These photodetectors supply electrical signals representative of the optical power levels which they detect. The circuit CC controls the source S on the basis of these electrical signals. The fact of separately detecting the power levels of the waves at $\lambda$ and $\lambda/2$ is a benefit, since an increase in power of the source has a non-linear influence on the conversion of the light in terms of $\lambda/2$.

The device EX has been placed at the output of the frequency doubler FD, but is could have been placed anywhere in the path of the light beam.

According to a variant embodiment of the invention, the measurement of power of the write beam may be done by the photodetector PD used for reading. In fact, it has been seen that the $\lambda/2$ wave contained in the write beam could be reflected to the photodetector PD. Under these conditions, the energy level of the beam which has just written on the recording medium can be measured by the photodetector PD. The latter delivers an electrical signal to a control circuit CC which controls the source S in consequence.

Moreover, it is possible to provide that the device MOUV, which controls the movement of the write/read head WRH with respect to the recording medium, communicates the position of the lead WRH to the control circuit CC. Thus the control circuit can adapt the level of power from the source according to the position of the head. For example, in the case in which the recording medium is a disc, the control circuit could demand a higher energy level when the head is at the periphery of the disc and reduce the energy level when the head is directed towards the centre of the disc.

Finally, according to another embodiment variant represented in broken lines in FIG. 12, an optical attenuation device ATT may be provided, placed in the path of the write beam and which is either introduced mechanically under the control of the photodetector PD of FIG. 12 or of the photodetectors PD1, PD2 of FIG. 11. This attenuation device may also be an electrooptical modulator such as a liquid-crystal cell.

An improvement to the invention will now be described, making it possible to obtain marks of constant dimensions even in the event of slight fluctuations in the power from the source S.

To do that, there is provision:
   on the one hand, during the writing, to transmit two beams one at the $\lambda 1$ wavelength, the other at a shorter wavelength $\lambda 2$ (($\lambda 1$)/2 for example). Two waves are thus transmitted, the energy distribution profiles of which are represented in FIG. 13a. The energies of these two waves are superimposed as is represented in FIG. 13b. A distribution profile of the $\lambda 1$ wave is obtained as a Gaussian curve, in which the peak of the curve is surmounted by the excess energy supplied by the wave of shorter wavelength at $\lambda 2$, according to the example taken;
   on the other hand, to adapt the threshold of etching of the recording medium to the energies of the transmitted beams (or reciprocally), in such a way that the etching threshold lies at a value higher than the maximum energy E1 supplied by the wave at $\lambda 1$, and less than the sum of the energies EM supplied by the waves at $\lambda 1$ and at $\lambda 2$. This etching threshold is therefore situated in the excess energy corresponding to the λ2 wavelength as is represented in FIG. 13b.

In this way, the diameter of the mark produced on the recording medium depends tightly on the wavelength λ2, and allows a certain fluctuation in the energy levels of the beams with respect to the recording threshold of the medium. It suffices that this threshold is situated in the excess energy corresponding to the beam of wavelength λ2.

In the foregoing, it has been assumed that the recording medium is static. In the event that it is moving with respect to the beams, the operation is similar; the movement of the recording medium plays a part in examination of the energy distributions.

By way of example, the write beam has a wavelength of substantially λ1=0.8 μm and the read beam has a wavelength of λ2=0.4 μm.

According to the method of the invention, the read beam at the λ2 wavelength is directed towards the recording medium along a direction collinear with that of the recording beam at the λ1 wavelength.

The read beam is retransmitted to an optical detection device which detects the intensity of the retransmitted beam.

In the case of a recording having affected the physical nature of the recording medium, it is actually a question of detecting a variation in the intensity of the retransmitted beam. In the case of a magnetic recording, the magneto-optical reading is done by using detection systems which exploit the rotation of the polarization of the light, and it is also a question of detecting a light intensity.

In the previously described system of FIG. 3, applied to writing according to FIG. 13b, the source S emits a beam at a wavelength λ1 which does not allow writing on a medium REC. As represented in FIG. 1, and as has already been described, the maximum energy supplied by this beam is lower than the write threshold of the recording medium. The source S also emits a beam λ1, at a wavelength λ2 which, combined with the beam at enables writing on the recording medium as has already been described. The beam is focused onto the recording medium REC by a lens L.

For reading, the source S (or another source) is also capable of illuminating the recording medium with the read beam at the λ2 wavelength which is less than λ1. The read beam is transmitted by the recording medium REC to a photodetector PD which thus makes it possible to read the information on the medium REC. For example, in the case of a medium operating in reflection mode, the read beam is reflected as is the case in FIG. 1.

By applying this principle, the systems of FIGS. 3 and 8 are applicable to this variant of the invention.

The method of the invention makes it possible to write and to read on preformatted media, that is to say media including areas where preformatting information is written, such as addresses and flags, etc. (see FIG. 14).

FIG. 14 represents a sampled-format recording medium (designated SSF in the technology), according to which preformatting information PREFOR is written from place to place on the medium REC. The recording system has to read this preformatting information and write data information INF between two preformatting information areas PREFOR. Track following is done by referring to the preformatting information, and between the preformatting information areas the system carries on going.

The preformatting information can be written onto the recording medium in such a way that it can be read at a first wavelength λ1.

In this case, the method according to the invention provides for:

reading the preformatting information at a usual read power level (of the order of one mW or of a few mW or less), by the use of two beams of wavelengths λ1 and λ2 (according to the foregoing, λ1=λ and λ2=λ/2). At these power levels, the level of the beam at λ2 is low, or even negligible, and the power level of the read beam corresponds to that of the beam λ1;

switching the power levels of the beams λ1 and λ2 so as to give them levels which are acceptable for writing on the recording medium (of the order of magnitude of about ten mW, or even several tens of mW, typically 10 to 15 mW). As was described previously, the maximum level of the beam at λ1 must be less than the recording threshold on the medium, and the sum of the energies supplied by the two beams must make it possible to write on the medium;

modulation of one or of the two beams in such a way as to write information on the medium;

switching of the filter (F in FIG. 8) so as to prohibit transmission of the beam at λ1. The reading is achieved, after writing, by the use of the beam at λ2, at the read power (of the order of one mW for example).

This reading is therefore achieved with a beam of much better resolution than that at λ1.

It is not necessary for the blocking switching time to be very rapid. In the sequences of the type "one disc revolution to write, one revolution to read", it is generally sufficient for it to be sufficiently short with respect to the duration of a revolution (20 ms for a speed of rotation of 3000 rpm).

According to a variant of this method, it is possible to make provision, during the write step, to write, in the areas reserved for the preformatting information, synchronization information which is then used on reading by the use of the beam at λ2. This mode is capable of leading to an increased format density.

In addition to the advantage of not requiring a rapid blocking modulator, this mode is well adapted to the production of systems which are compatible with the existing systems.

The preformatting information written on the recording medium may also have a resolution suitable for reading at the λ2 wavelength (with λ2=λ/2) (or a wavelength greater than λ2).

The method according to the invention thus makes provision for:

reading the preformatting information by the use of a beam at λ2, the beam at λ1 then being blocked (for example by the filter F of FIG. 8). The read power is thus that of the beam at λ2. The beam λ2 is thus matched in wavelength and in power to reading the preformatting information;

switching the filter in such a way as to unblock the beam at λ1 and to allow it to be transmitted to the recording medium at the same time as the beam at λ2. These beams are transmitted at high power;

modulating the beams at λ1 and at λ2 for writing data information;

blocking the beam at λ1 by switching of the filter in order to enable reading by the use of the λ2 beam, after writing.

It should be noted that the switching of the filter for blocking and unblocking the beam at λ1 has to be rapid: preferably of the order of magnitude of the modulation period of the signal to be recorded, particularly for unblocking after reading of the preformatting information and before writing of the data information.

However, the unblocking time may be greater than the modulation period of the signal to be recorded; however, it is beneficial for it to be less than the time provided in the operating mode previously described, so as to obtain a greater density in the recordings.

The reading of the data information can then be done very rapidly after the writing due to the use of a rapid-switching filter.

This method has the advantage of leading to dense formats.

FIGS. 15a and 15b represent recording media having continuous composite formats (designated CCS in the technology), in which the formatting includes formatting information areas (as in FIG. 14), but also an outline of the recording track produced, for example, in the form of an etching of grooves in the recording medium. FIG. 15a represents a recording medium REC bearing at least one pre-etched groove GRO and preformatting information from place to place. The data information, such as INF1 and INF2 are written onto the groove GRO. FIG. 15b represents a recording medium REC in which two pre-etched grooves GRO1, GRO2 delimit a recording track. The preformatting information PREFOR is written between the two grooves. The writing of information such as INF1 and INF2 is then done between these grooves.

In this type of format, during writing, the system thus provides following of the recording track by following pre-etched grooves.

To do that, the two operating modes previously described can be applied. However, additionally, in order to achieve following of the track outline, there is provision that, during the writing, part at least of the write beams is reflected by the recording medium towards one or more photodetectors and towards a track following system. The light reflected to the photodetector or photodetectors may be at $\lambda 1$ or at $\lambda 2$, or a mixture of these two wavelengths.

It should be noted that these record/read methods related to preformatted recording media can be adapted to methods of writing in which the recording threshold of the recording medium is less than the maximum value of the wave at $\lambda 1$ as is represented in FIG. 2a. And it is possible to transmit only $\lambda 1$ for writing.

The system according to the invention thus enables:

recording at the wavelength $\lambda$ by modulation of the semiconductor laser, and real-time checking of the signal written on the medium at the wavelength $\lambda/2$. The beams are collinear in the path of the optical head;

reading of the information at the $\lambda/2$ wavelength alone. A bandpass filter or a dichroic mirror is interposed on the beam coming from the doubler. It protects the medium from the optical power available at the wavelength $\lambda$.

The advantages of the system of the invention are as follows:

the device presented contains a laser and a frequency-doubler component generating two collinear beams (or beams possibly made collinear) at the wavelengths $\lambda$ and $\lambda/2$ as the intensity of the read beam is lower than that required for writing the information, the doubler component operates with a deliberately limited conversion efficiency. This condition offers a wide choice of solutions on the basis of doubler crystals used in their volume or in guided optical mode the solution proposed does not require the development of a power laser source at the $\lambda 2$ wavelength ("blue")

an improvement in the storage capacity, possibly amounting to a factor of 4, is obtained.

We claim:

1. Optical method of writing/reading information on a recording medium, comprising the steps of:

superimposing a first optical beam at a first wavelength and at least a second optical beam of a second wavelength to form a write beam; and writing said information on said recording medium with said write beam.

2. Method according to claim 1, wherein said writing step comprises:

providing as the recording medium a medium comprising a material exhibiting a thermal non-linearity threshold situated between a maximum of a sum of energies of the first and second optical beams and an energy level situated substantially below the maximum energy of the first optical beam; and writing on said medium.

3. Method according to claim 1, wherein said writing step comprises:

providing as the recording medium a medium comprising a non-linear material exhibiting a recording energy threshold higher than a maximum energy supplied by the first optical beam and lower than a sum of energies supplied by the first and second optical beams; and writing on said medium.

4. Method according to claim 3, wherein said writing step comprises writing said information on the recording medium with said write beam, wherein the first and second optical beams converge towards a same point of the recording medium.

5. Method according to claim 1, said writing step comprises:

providing as the recording medium a medium comprising a material exhibiting a thermal non-linearity threshold such that dimensions of a mark produced by the write beam correspond to dimensions of a spot of the second optical beam; and writing on said medium.

6. Method according to claim 1, further comprising the step of:

reading information from the recording medium with a read beam at the second wavelength.

7. Method according to claim 1, wherein said superimposing step comprises superimposing the first optical beam at the first wavelength with the second optical beam at the second wavelength, where said second wavelength is substantially equal to one-half of the first wavelength.

8. Method according to claim 1, further comprising one of transmitting the second optical beam at the second wavelength and reflecting the second optical beam by the recording medium towards a photodetector in order to check each information item written by the first optical beam at the first wavelength.

9. Method according to claim 1, further comprising:

reflecting the second optical beam by the recording medium towards a photodetector in order to check each information item written by the first optical beam at the first wavelength; and supplying a signal representing an intensity of the reflected second optical beam received by the photodetector, in order to set a power from a source.

10. Method according to claim 1, wherein the first wavelength is situated in the range of infrared wavelengths and the second wavelength is situated in the range of blue wavelengths.

11. Method according to claim 1, wherein said writing step comprises writing said information with respective light spots of a first diameter corresponding to two adjacent information items overlapping partially.

12. Method according to claim 1, further comprising the steps of:
reading information from said recording medium, including deriving the second optical beam from a first portion of the first optical beam and directing a second portion of the first optical beam towards the recording medium.

13. Method according to claim 1, wherein said writing step comprises writing said information on the recording medium with said write beam, wherein the first and the second optical beams are collinear.

14. Method according to claim 1, wherein said writing step comprises writing said information on the recording medium with said write beam, wherein a diameter of a mark written by said write beam is substantially equal to half of a diameter of a light spot formed by the first and the second optical beams on the recording medium.

15. Method according to claim 1, wherein said writing step comprises modulating separately and focusing the first and second optical beams in two planes of the recording medium.

16. Method according to claim 1, further comprising the steps of:
recording/reading on a preformatted medium on which a preformatting information is readable by a read beam at the first wavelength;
reading the preformatting information with the two superimposed beams at a low power level;
switching the two superimposed beams to a high power level above the low-power level;
writing data information onto the information medium by modulation of at least one of the two superimposed beams at high-power level;
blocking the first optical beam and transmission of the second optical beam alone for reading the data information.

17. Method according to claim 16, characterized in that said blocking step comprises blocking of the first optical beam in a blocking time which is less than 1 ms.

18. Method according to claim 16, wherein said recording/reading step comprises recording/reading on a disc shaped recording medium and wherein a blocking time is less than a time which the disc takes to make one revolution.

19. Method according to claim 16, characterized in that, said writing step comprises writing with a part of at least of one the two optical beams being retransmitted by the recording medium towards a track following system.

20. Method according to claim 1, further comprising the steps of:
recording/reading on a preformatted medium on which a preformatting information has a resolution allowing reading with a read beam at the second wavelength;
reading the preformatting information by the second optical beam;
unblocking the first optical beam and transmission of both optical beams to the recording medium;
writing data information onto the medium by modulation of at least one of the two optical beams at high-power level;
blocking the first optical beam and transmission of the second optical beam alone for reading the data information.

21. Method according to claim 20, wherein the blocking step comprises blocking and unblocking the first optical beam at times which are an order of magnitude less than a modulation period of the data information recorded.

22. Method according to claim 20, wherein said recording/reading step comprises recording/reading on a disc shaped recording medium, and blocking and the unblocking of the first beam at times less than a time which the disc takes to make one revolution.

23. Optical system for writing/reading information comprising:
a recording medium on which information is written;
an optical source which emits a first beam at a first wavelength; and
a frequency changer receiving the first beam and transmitting, to the recording medium, a write beam which comprises the first beam at the first wavelength and a second beam at a second wavelength that is less than the first wavelength.

24. System according to claim 23, wherein the recording medium comprises a material exhibiting a non-linearity threshold situated between a maximum of a sum of energies of the first and second beams and an energy level situated in a vicinity of a maximum energy of the first beam.

25. System according to claim 23, wherein the recording medium comprises a material exhibiting a thermal non-linearity threshold such that dimensions of a mark produced by the write beam correspond to dimensions of a spot made by the second beam.

26. System according to claim 23, further comprising a controllable filtering device configured to transmit the first and the second beams to the recording medium during a write phase and transmitting only the second beam during a read phase.

27. System according to claim 26, characterized in that the controllable filtering device is a ferroelectric liquid-crystal cell.

28. System according to claim 26, the controllable filtering device is a rapid-switching device having a switching time which is less than or within an order of magnitude of a modulation period of a data information to be recorded or to be read on the recording medium.

29. System according to claim 26, wherein the controllable filtering device is a slow-switching device having a switching time which is greater than a modulation period of a data information to be recorded or to be read on the recording medium.

30. System according to claim 23, wherein the first and the second beams transmitted to the recording medium are collinear.

31. System according to claim 23, wherein the frequency changer comprises a frequency doubler.

32. System according to claim 23, further comprising:
a photo detector which receives light that is retransmitted by the recording medium; and
a dichroic device that prohibits light of the first wavelength from reaching the photodetector.

33. System according to claim 32, further comprising:
an optical modulator situated between the frequency changer and the dichroic device, said optical modulator configured to modulate the write beam and a read beam and configured to filter the write beam during a read operation.

34. System according to claim 32, further comprising an optical modulator situated between the frequency changer and the dichroic device for modulating the write beam and a read beam.

35. System according to claim 23, further comprising a light modulator configured to modulate the write beam and a read beam, said light modulator disposed between the optical source and the recording medium.

36. System according to claim 31, characterized in that the light modulator comprises an electrooptical modulator.

37. System according to claim 23, further comprising a plurality of dichroic transmission devices having at least a higher coefficient of transmission at the second wavelength than a the first wavelength.

38. Optical recording medium, comprising a non-linear material which changes from a first state to a second state non-linearly with respect to an energy of an illuminating beam, said non-linear material having a recording threshold, said non-linear material recording a recorded information item on a part of an illuminated portion that is illuminated by a first beam having a first wavelength and an energy that exceeds said recording threshold of a non-linear material, and the recorded information item readable only by a second beam of a second wavelength, which is less than the first wavelength.

39. The optical recording medium of claim 38 further comprising an optically readable surface, wherein the optically readable surface includes preformatting information readable at the first wavelength and data information readable at the second wavelength.

40. Recording medium according to claim 38, wherein the second wavelength is substantially one-half of the first wavelength.

* * * * *